United States Patent
Vadrevu et al.

(10) Patent No.: US 9,443,008 B2
(45) Date of Patent: Sep. 13, 2016

(54) CLUSTERING OF SEARCH RESULTS

(75) Inventors: Srinivas Vadrevu, Milpitas, CA (US); Yi Chang, Santa Clara, CA (US); Zhaohui Zheng, Mountain View, CA (US); Bo Long, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 965 days.

(21) Appl. No.: 12/835,954

(22) Filed: Jul. 14, 2010

(65) Prior Publication Data

US 2012/0016877 A1    Jan. 19, 2012

(51) Int. Cl.
*G06F 17/30* (2006.01)

(52) U.S. Cl.
CPC ... *G06F 17/30705* (2013.01); *G06F 17/30696* (2013.01)

(58) Field of Classification Search
CPC .................. G06F 17/30696; G06F 17/30705; G06F 17/30713; G06F 17/30864; G06F 17/3086
See application file for complete search history.

(56) References Cited

U.S. PATENT DOCUMENTS

| | | | |
|---|---|---|---|
| 7,185,001 B1 * | 2/2007 | Burdick et al. | |
| 7,349,899 B2 * | 3/2008 | Namba | |
| 2003/0110181 A1 * | 6/2003 | Schuetze et al. | 707/103 R |
| 2003/0144994 A1 * | 7/2003 | Wen et al. | 707/3 |
| 2004/0199546 A1 * | 10/2004 | Calistri-Yeh et al. | 707/104.1 |
| 2004/0267686 A1 * | 12/2004 | Chayes et al. | 707/1 |
| 2006/0112125 A1 * | 5/2006 | Potok et al. | 707/101 |
| 2006/0117002 A1 * | 6/2006 | Swen | 707/4 |
| 2007/0143235 A1 * | 6/2007 | Kummamuru et al. | 706/15 |
| 2007/0219945 A1 * | 9/2007 | Wang et al. | 707/2 |
| 2008/0120292 A1 * | 5/2008 | Sundaresan et al. | 707/5 |
| 2008/0133508 A1 * | 6/2008 | Jiang et al. | 707/5 |
| 2008/0183695 A1 * | 7/2008 | Jadhav | 707/5 |
| 2009/0313228 A1 * | 12/2009 | Grandhi et al. | 707/3 |
| 2011/0196851 A1 * | 8/2011 | Vadlamani et al. | 707/706 |

OTHER PUBLICATIONS

Das, A. S. et al., "Google news personalization: scalable online collaborative filtering," *WWW 2007*, pp. 271-280, 2007.
Haveliwala, T. H. et al., "Scalable techniques for clustering the web," *WebDB_S2000*, Third International Workshop on the Web and Databases, In conjunction with ACM, 2000.
Parsons, L. et al., "Subspace clustering for high dimensional data: a review," *SIGKDD Explor. Newsl.*, 6(1):90-105, 2004.
Zeng, H. -J. et al. "Learning to cluster web search results," *SIGIR*, pp. 210-217, 2004.
Robertson, S. et al., "Simple BM25 Extension to Multiple Weighted Fields," *CIKM'04*, Nov. 8-13, 2004.

(Continued)

*Primary Examiner* — Shew-Fen Lin
(74) *Attorney, Agent, or Firm* — Berkeley Law & Technology Group, LLP

(57) ABSTRACT

One particular embodiment clusters a plurality of documents using one or more clustering algorithms to obtain one or more first sets of clusters, wherein: each first set of clusters results from clustering the documents using one of the clustering algorithms; and with respect to each first set of clusters, each of the documents belongs to one of the clusters from the first set of clusters; accesses a search query; identifies a search result in response to the search query, wherein the search result comprises two or more of the documents; and clusters the search result to obtain a second set of clusters, wherein each document of the search result belongs to one of the clusters from the second set of clusters.

18 Claims, 6 Drawing Sheets

(56) References Cited

OTHER PUBLICATIONS

"Okapi BM25," *Wikipedia*, http.en.wikipedia.org/wiki/Okapi_BM25, last modified Jun. 21, 2010; downloaded Jul. 15, 2010, 2010.

"Cosine Similarity," *Wikipedia*, http://en.wikipedia.org/wiki/Cosine_similarity, last modified Apr. 3, 2010; downloaded Jul. 15, 2010, 2010.

* cited by examiner

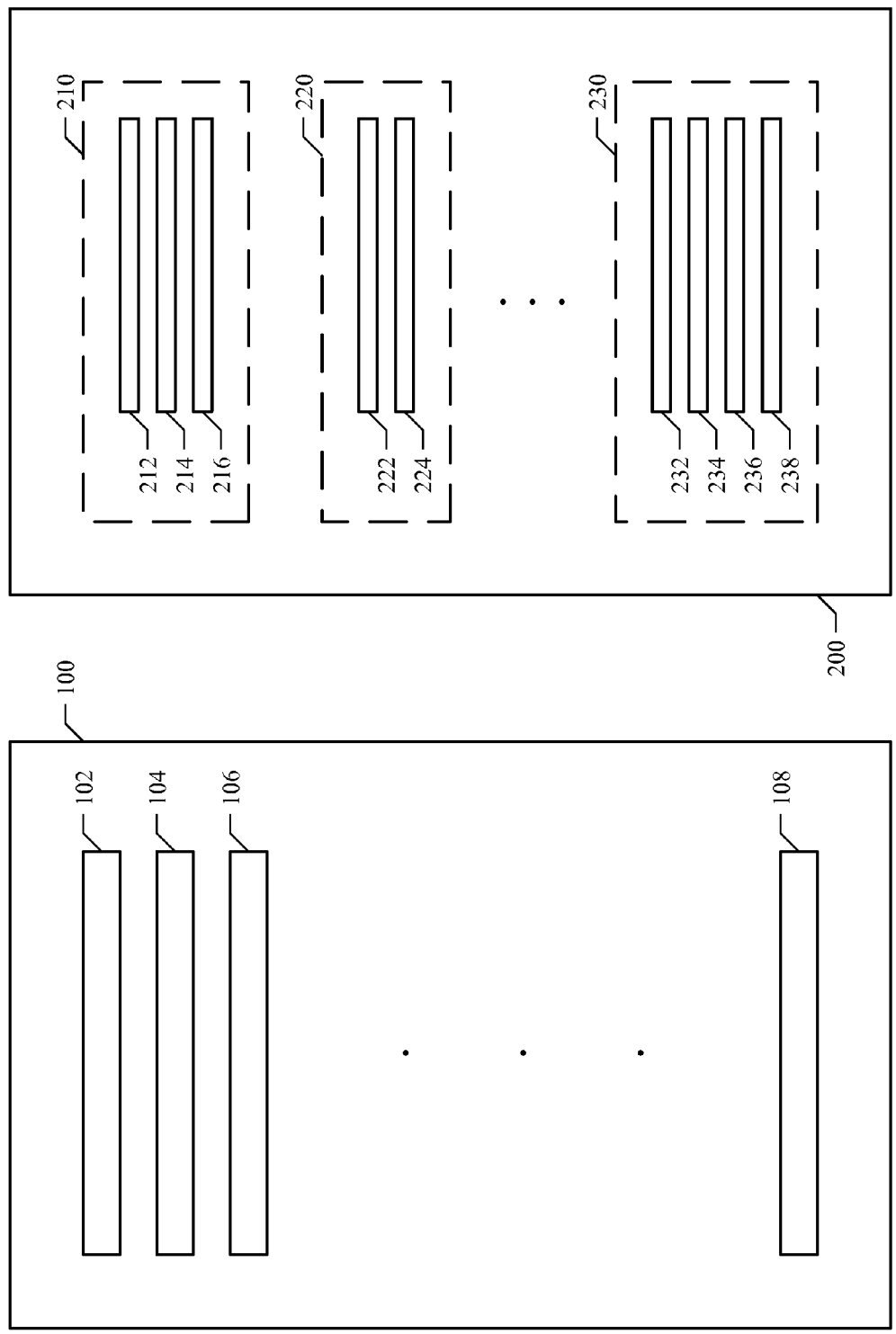

CLUSTERING OF SEARCH RESULTS

TECHNICAL FIELD

The present disclosure generally relates to improving the quality of search results identified for search queries and more specifically relates to clustering documents included in a search result based on their relatedness or similarity.

BACKGROUND

The Internet provides a vast amount of information. The individual pieces of information are often referred to as "network resources" or "network contents" and may have various formats, such as, for example and without limitation, texts, audios, videos, images, web pages, executables, etc. The network resources or contents are stored at many different sites, such as on computers and servers, in databases, etc., around the world. These different sites are communicatively linked to the Internet through various network infrastructures. Any person may access the publicly available network resources or contents via a suitable network device (e.g., a computer, a smart mobile telephone, etc.) connected to the Internet.

However, due to the sheer amount of information available on the Internet, it is impractical as well as impossible for a person (e.g., a network user) to manually search throughout the Internet for specific pieces of information. Instead, most network users rely on different types of computer-implemented tools to help them locate the desired network resources or contents. One of the most commonly and widely used computer-implemented tools is a search engine, such as the search engines provided by Microsoft® Inc. (http://www.bing.com), Yahoo!® Inc. (http://search.yahoo.com), and Google™ Inc. (http://www.google.com). To search for information relating to a specific subject matter or topic on the Internet, a network user typically provides a short phrase or a few keywords describing the subject matter, often referred to as a "search query" or simply "query", to a search engine. The search engine conducts a search based on the search query using various search algorithms and generates a search result that identifies network resources or contents that are most likely to be related to the search query. The network resources or contents are presented to the network user, often in the form of a list of links, each link being associated with a different network document (e.g., a web page) that contains some of the identified network resources or contents. In particular embodiments, each link is in the form of a Uniform Resource Locator (URL) that specifies where the corresponding document is located and the mechanism for retrieving it. The network user is then able to click on the URL links to view the specific network resources or contents contained in the corresponding document as he wishes.

Sophisticated search engines implement many other functionalities in addition to merely identifying the network resources or contents as a part of the search process. For example, a search engine usually ranks the identified network resources or contents according to their relative degrees of relevance with respect to the search query, such that the network resources or contents that are relatively more relevant to the search query are ranked higher and consequently are presented to the network user before the network resources or contents that are relatively less relevant to the search query. The search engine may also provide a short summary of each of the identified network resources or contents.

There are continuous efforts to improve the qualities of the search results generated by the search engines. Accuracy, completeness, presentation order, and speed are but a few of the performance aspects of the search engines for improvement.

SUMMARY

The present disclosure generally relates to improving the quality of search results identified for search queries and more specifically relates to clustering documents included in a search result based on their relatedness or similarity.

Particular embodiments cluster a plurality of documents using one or more clustering algorithms to obtain one or more first sets of clusters, wherein: each first set of clusters results from clustering the documents using one of the clustering algorithms; and with respect to each first set of clusters, each of the documents belongs to one of the clusters from the first set of clusters.

Particular embodiments access a search query; identify a search result in response to the search query, wherein the search result comprises two or more of the documents; and cluster the search result to obtain a second set of clusters, wherein each document of the search result belongs to one of the clusters from the second set of clusters, comprising: for each unique pair of documents of the search result, compute a similarity measure for the two documents with respect to the search query based on the first sets of clusters and a similarity algorithm; and cluster the documents of the search result based on the similarity measures.

These and other features, aspects, and advantages of the disclosure are described in more detail below in the detailed description and in conjunction with the following figures.

BRIEF DESCRIPTION OF THE DRAWINGS

FIG. 1 illustrates an example search result presented in list format.

FIG. 2 illustrates an example search result presented in cluster format.

DETAILED DESCRIPTION

Figure 3:
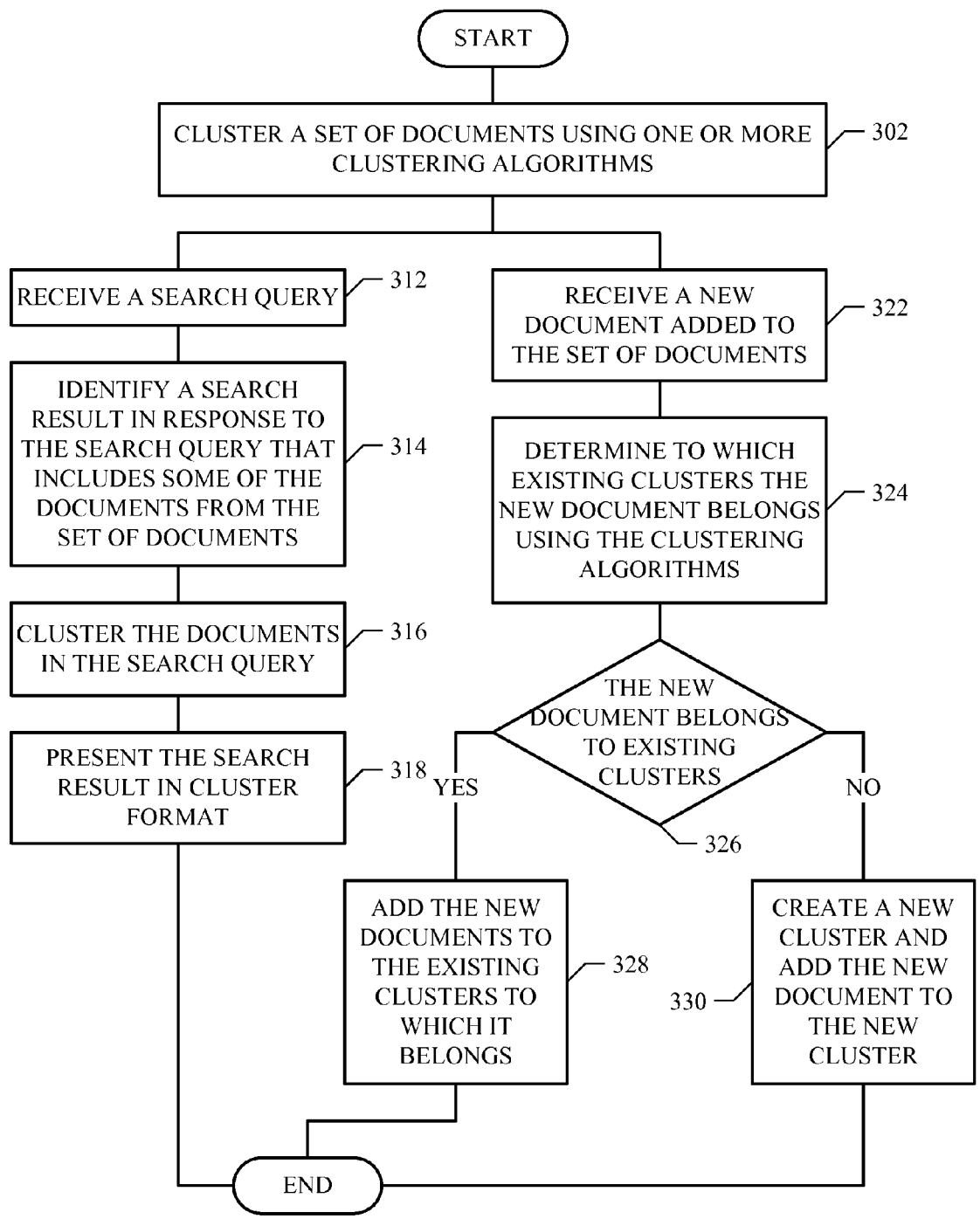
FIG. 3 illustrates an example method for clustering search results.

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A search engine is a computer-implemented tool designed to search for information relevant to specific subject matters or topics on a network, such as the Internet, the World Wide Web, or an Intranet. To conduct a search, a network user may issue a search query to the search engine. The search query generally contains one or more words that describe a subject matter. In response, the search engine may identify one or more documents available on the network, which are likely to be related to the search query. These documents may collectively be referred to as a search result identified for the search query. In particular embodiments, the documents may be in any format or have any content, such as, for example and without limitation, text, audio, video, or binary.

Sophisticated search engines implement many other functionalities in addition to merely identifying the relevant documents as a part of the search process. For example, a search engine usually ranks the documents identified for a search query according to their relative degrees of relevance with respect to the search query, such that the documents that are relatively more relevant to the search query are ranked higher and consequently are presented to the network user before the documents that are relatively less relevant to the search query. The search engine may also provide a short summary of each of the identified documents.

Once a research result has been identified for a search query, the search result may be presented to the user requesting the search in a particular format, such as the list format or the cluster format. FIG. 1 illustrates an example search result presented in list format. The search result may include any number of documents (e.g., documents 102, 104, 106, 108). These documents may be ranked according to their relative degrees of relevance with respect to the corresponding search query. The documents may then be presented to the user using, for example, a web page 100, in which the documents (e.g., documents 102, 104, 106, 108) are listed one at a time according to their ranking order. For example, the highest ranking document (e.g., document 102) may be listed at the top of web page 100, followed by the second highest ranking document (e.g., document 104), followed by the third highest ranking document (e.g., document 106), and so on.

Alternatively, in particular embodiments, the documents included in a search result may be clustered into separate groups or clusters based on their relatedness or similarity in terms of, for example and without limitation, their subject matters, content, layout, and other applicable characteristics. For example, suppose that in response to a search query "earthquake", a search engine has identified a set of documents, each of which may include content that relates to the subject matter "earthquake". However, these documents may not all relate to the same earthquake. Some of the documents may be related to the Haiti earthquake; some of the documents may be related to the China earthquake; and some of the documents may be related to the California earthquakes. Furthermore, among the documents that all relate to the California earthquakes, different documents may be related to different earthquakes occurred in California, since there have been multiple earthquakes occurred in California. Thus, particular embodiments may cluster the documents of the search result into separate groups or clusters, with the documents relating to the same specific earthquake being clustered together.

FIG. 2 illustrates an example search result presented in cluster format. Again, the search result may include any number of documents (e.g., documents 212, 214, 216, 222, 224, 232, 234, 236, 238), and these documents may be ranked according to their relative degrees of relevance with respect to the corresponding search query. Furthermore, the documents may be clustered into separate groups or clusters based on their relatedness or similarity. Each cluster may include any number of specific documents included in the search results. The documents may then be presented to the user using, for example, a web page 200, in which the related or similar documents (e.g., documents that belong to the same cluster) are presented together. For example, a cluster 210 may include three related or similar documents 212, 214, 216. Another cluster 220 may include two related or similar documents 222, 224. A third cluster 230 may include four related or similar documents 232, 234, 236, 238. In addition, there may be a short phrase presented with each cluster describing the main subject matter or topic of the cluster (e.g., "earthquake occurred in Haiti on Jan. 12, 2010"; or "earthquake occurred in San Francisco on Oct. 17, 1989").

With cluster format, the documents of a search result are not necessarily presented strictly according to their ranking order because clustering takes into consideration the relatedness or similarity among the documents. For example, in FIG. 2, cluster 210 is presented at the top of web page 200. However, document 212 is not necessarily the highest ranking document in the search result, or document 214 is not necessarily the second highest ranking document in the search result. In fact, document 222 may have a higher ranking than document 212 with respect to the corresponding search query even though it is presented below document 212 in web page 200. On the other hand, within each cluster, the documents may be presented according to their relative ranking order. For example, within cluster 210, document 212 may have a higher ranking than document 214, which in turn may have a higher ranking than document 216.

Clustering of search results may provide a unified view on the search results by grouping the similar or related documents. This allows the users to examine all the related documents of a search result without having to go through hundreds of documents, since a group of related documents may have very different rankings. Clustering becomes more import in the context of certain domains where there may be thousands of related documents for a given search query within a domain. For example, in the news domain, there may be millions of news articles on the Internet at any given time. However, most of these news articles are related to a relatively small number of news topics as news articles tend to be about subject matters currently in the news. By clustering the available news articles in terms of the related news stories or topics, the number of groups may be significantly less than the number of news articles. By presenting a search result of news articles in cluster format (e.g., as illustrated in FIG. 2), it is much easier for a user to browse the search result in terms of news stories or topics rather than individual news articles. In addition, news publishers often re-publish news articles from different sources (e.g., from other news publishers or agencies) in order to provide comprehensive coverage on a particular news topic, which may further exacerbates the problem by increasing the redundancy in the search results (i.e., increasing the number of duplicate news articles in the search results). Instead of leaving the search result organization to the users, a clustered search result may provide an overview to explore a specific topic.

There has been some effort in developing methods for clustering search results, especially clustering search results in real time or online. That is, after a search query has been received and the documents to be included in the search result for the search query have been identified, clustering is performed on the identified documents before the search result is presented to the user requesting the search. In practice, such online clustering requires that the clustering is completed within a relatively short amount of time (e.g., within a few microseconds), since most users do not wish to wait a significant amount of time before receiving the search results for their search queries. Consequently, online clustering may only be performed on a relatively small number of documents each time. Some methods perform online clustering only on the top ranked documents included in each search result (e.g., on the top ranked 100 documents of each search result). In addition, most of the existing work on search result clustering focuses more on salient feature extraction and utilizing this information to cluster the search results. However the salient features do not always provide the complete picture about the documents on which the clustering is performed.

Particular embodiments may cluster search results based on both offline clustering results and online clustering results. FIG. 3 illustrates an example method for clustering search results. Given a set of documents, $D=\{d_1, d_2, \ldots d_m\}$, where $m \geq 1$ and each $d_i \in D$ denotes a particular document from D. In particular embodiments, D is the corpus of documents within which searches are conducted. For example, D may be all the web pages or all the news articles available on a network (e.g., the Internet). In particular embodiments, the number of documents in D or the specific documents included in D may vary from time to time. For example, new documents may be added to D as they become available (e.g., new web pages or news articles are added to the network), or old documents may be removed from D when they are no longer available (e.g., old web pages or news articled are deleted from the network).

Particular embodiments may perform clustering on the entire set of documents, D, using one or more clustering algorithms, as illustrated in step 302 of FIG. 3. In particular embodiments, the clustering illustrated in step 302 may be performed offline (e.g., before search queries are received). Therefore, step 302 may take longer time than online clustering. For example, step 302 may be performed periodically (e.g., once a day or once a week) or as needed (e.g., when the specific documents from D have changed sufficiently).

There are various clustering algorithms that may be used to cluster a set of documents. However, since in practice, a corpus of documents within which searches are conducted tend to be very large (e.g., D may include tens of millions of documents), the clustering algorithms used to cluster the documents from D offline may need to be sufficiently scalable to handle such large number of documents. Particular embodiments may use clustering algorithms such as, for example and without limitation, Minhash (Minwise Independent Permutation) clustering algorithm, subspace clustering algorithm, K-Means clustering algorithm, or correlation clustering (co-clustering) algorithm to perform clustering on all the documents from D.

In particular embodiments, given a clustering algorithm and a set of documents, D, clustering the documents from D using the clustering algorithm may result in a set of clusters, where each cluster may include any number of documents from D. Each document from D may belong to one of the resulting clusters from the set, and to which specific cluster a document belongs is determined by the clustering algorithm used to perform the clustering. Let $C^1=\{c_1^1, c_2^1, \ldots c_{n^1}^1\}$ denote the set of clusters resulted from performing clustering on the documents from D offline using a first clustering algorithm, where $n^1 \geq 1$ and each $c_j^1 \in C^1$ denotes a particular cluster from $C^1$. Each document from D may belong to one of the clusters from $C^1$; that is $d_i \in c_j^1$. Similarly, let $C^2=\{c_1^2, c_2^2, \ldots c_{n^2}^2\}$ denote the set of clusters resulted from performing clustering on the documents from D offline using a second clustering algorithm, where $n^2 \geq 1$ and each $c_j^2 \in C^2$ denotes a particular cluster from $C^2$. Again, each document from D may belong to one of the clusters from $C^2$; that is $d_i \in c_j^2$. And so on. If there are $K \geq 1$ number of clustering algorithms used to perform clustering on D offline, then there are K sets of clusters, $C^1, \ldots, C^K$, resulted from performing clustering on D offline.

In particular embodiments, because different clustering algorithms group the documents based on different criteria, different sets of clusters may have different numbers of clusters (e.g., $n^1 \neq n^2$). Moreover, for two specific documents, different clustering algorithms may assign them either to the same cluster or to two different clusters. For example, given two documents, $d_1$ and $d_2$, from D, one clustering algorithm (e.g., the first clustering algorithm) may group them to the same cluster, while another clustering algorithm (e.g., the second clustering algorithm) may group them to two different clusters.

Once the offline clustering has been performed on the documents from D using the K clustering algorithms, particular embodiments may store the resulting K sets of clusters, including which clustering algorithm has assigned which document to which specific cluster. In particular embodiments, the information may be made accessible to a search engine so that the information may be used in connection with clustering search results online.

Subsequently, in particular embodiments, a search engine may receive a search query from, for example, a network user, as illustrated in step 312 of FIG. 3. The search engine may conduct a search in response to the search query using an appropriate search algorithm and within the context of the set of documents, D, and identifies a number of documents from D that are considered to be relevant to the search query. The search engine may include these relevant documents in the search result constructed for the search query, as illustrated in step 314 of FIG. 3. The search engine may rank the documents included in the search result based on, for example, their relative degrees of relevancy with respect to the search query using an appropriate ranking algorithm.

Let $D^R=\{d_1, d_2, \ldots d_{m^R}\}$ denote the set of documents included in the search result, where $1 \leq m^R \leq m$, $D^R \subseteq D$, and each $d_i \in D^R$ denotes a particular document from $D^R$. Note that each document from $D^R$ is also included in D since $D^R$ is in fact a subset of D. Particular embodiments may perform clustering on the documents included in the search result, $D^R$, as illustrated in step 316 of FIG. 3. In particular embodiments, the clustering illustrated in step 316 is performed in real time (i.e., online), after the specific documents included in the search result is identified but before the search result is presented to the user requesting the search. In particular embodiments, performing clustering on the documents from $D^R$ online may result in another set of clusters, $C^R=\{c_1^R, c_2^R, \ldots c_{n^R}^R\}$, where $n^R \geq 1$ and each $c_j^R \in C^R$ denotes a particular cluster from $C^R$. In particular embodiments, each document from $D^R$ may belong to one of the clusters of $C^R$. In particular embodiments, $C^R$ may differ from the sets of clusters, $C^1, \ldots, C^K$, resulted from the offline clustering of D illustrated in step 302.

In particular embodiments, the documents from $D^R$ (i.e., the documents included in the search result) may be clustered based on their relatedness or similarity with respect to the search query received in step 312, such that related or similar documents are grouped to the same cluster from $C^R$. Given two documents from $D^R$, particular embodiments may compute a similarity measure for the two documents with respect to the search query, which may indicate how closely the two documents are related. Particular embodiments may then assign the documents from $D^R$ to specific clusters from $C^R$ based on these similarity measures. For example, if the similarity measure for two documents from $D^R$ indicates that they are closely related, particular embodiments may assign them to the same cluster from $C^R$. Conversely, if the similarity measure for two documents from $D^R$ indicates that they are not related, particular embodiments may assign them to different clusters from $C^R$.

Given a search query, q, and two documents, $d_1$ and $d_2$ (e.g., $d_1$ and $d_2$ may be any two documents from $D^R$), particular embodiments may compute the similarly measure for $d_1$ and $d_2$ with respect to q as a weighted sum of a clustering similarity between the two documents, $d_1$ and $d_2$, and a query similarity between the two documents, $d_1$ and $d_2$. That is, the similarity measure for the two documents with respect to the search query may be computed as a weighted sum of a similarity from offline clusters and a query-based similarity between the two documents. Each cluster may have a unique identifier (e.g., a cluster ID) and be referred to by that identifier. An example similarity from offline clusters or cluster IDs may be defined as a linear combination of agreements from several offline cluster IDs, where the weights may be either machine learned or provided by a human. An example query-based similarity between the two documents may be defined as a fraction of the sum of textual match between the query and the individual documents to the textual match between the query and the intersection of the documents. The two similarities may then be combined with an additional weight that may be either machine learned or provided by a human.

More specifically, particular embodiments may compute the similarity measure for $d_1$ and $d_2$ with respect to q as:

$$sim(q, d_1, d_2) = \alpha \sum_{k=1}^{K} w_k c_k + (1 - \alpha) \frac{BM25(q, d_1) + BM25(q, d_2)}{BM25(q, d_1 \cap d_2)}. \quad (1)$$

The first part of EQUATION (1) relates to the clustering performed on D offline (e.g., as illustrated in step 302), while the second part of EQUATION (1) relates to the online analysis performed on $d_1$ and $d_2$ themselves. Note that $d_1$ and $d_2$ are included in both D and $D^R$.

With respect to the first part of EQUATION (1), recall that there may be K clustering algorithms used to perform clustering on D offline as illustrated in step 302, and given two documents from D, different clustering algorithms may assign them to the same or different clusters. In particular embodiments, if the $k^{th}$ clustering algorithm assigns $d_1$ and $d_2$ to the same cluster during the clustering performed on D offline, then $c_k=1$. On the other hand, if the $k^{th}$ clustering algorithm assigns $d_1$ and $d_2$ to two different clusters during the offline clustering, then $c_k=0$. In particular embodiments, $w_k$ may be a weight (e.g., a value between 0 and 1) assigned to the $k^{th}$ clustering algorithm, which may be determined based on experiments or empirical data or assigned a default value.

With respect to the second part of EQUATION (1), BM25 or Okapi BM25 is a ranking function sometimes used by search engines to rank documents identified for a given search query according to their relative degrees of relevance with respect to the search query. Thus, $BM25(q, d_1)$ indicates the degree of relevance for $d_1$ with respect to q; and $BM25(q, d_2)$ indicates the degree of relevance for $d_2$ with respect to q. In particular embodiments, $d_1 \cap d_2$ represents the overlap or union between $d_1$ and $d_2$ (e.g., a new document created by concatenating $d_1$ and $d_2$); and $BM25(q, d_1 \cap d_2)$ indicates the degree of relevance for the new document, $d_1 \cap d_2$, with respect to q.

In particular embodiments, $\alpha$ is the weight (e.g., a value between 0 and 1) assigned to the first part of EQUATION (1), which may be used the control the influence of the results of offline clustering on the similarity measure computed for $d_1$ and $d_2$. In particular embodiments, $\alpha$ may be determined based on experiments or empirical data or assigned a default value.

Alternatively, given a search query, q, and two documents, $d_1$ and $d_2$ (e.g., $d_1$ and $d_2$ may be any two documents from $D^R$), particular embodiments may compute the similarity measure for $d_1$ and $d_2$ with respect to q as a weighted sum of a clustering similarity between the two documents, $d_1$ and $d_2$, and a cosine similarity between the two documents, $d_1$ and $d_2$. In particular embodiments, the cosine similarity between the two documents may be an adjusted cosine similarity between the two documents after the term vectors in the two documents are adjusted for their proximity to the query terms. That is, the similarity measure for the two documents with respect to the search query may be computed as a weighted sum of similarity from offline clusters and the cosine similarity between the two documents after they are adjusted for proximity of the query terms in the documents. Again, each cluster may have a unique identifier (e.g., a cluster ID) and be referred by that identifier. An example similarity from the offline clusters or cluster IDs may be defined as a linear combination of agreements from several offline cluster IDs, where the weights may be either machine learned or provided by a human. The term vectors of the documents maybe adjusted for the proximity of query terms by inversely weighting the distance to the closest query terms to the frequency of the terms. An example cosine similarity between the two documents after they are adjusted for proximity of the query terms in the documents may be a cosine similarity of the document term vectors after they are adjusted for the proximity to the query terms.

More specifically, particular embodiments may compute the similarity measure for $d_1$ and $d_2$ with respect to q as:

$$sim(q, d_1, d_2) = \alpha \sum_{k=1}^{K} w_k c_k + (1 - \alpha) \cos(d'_1, d'_2). \quad (2)$$

Similarly to EQUATION (1), the first part of EQUATION (2) relates to the clustering performed on D offline (e.g., as illustrated in step 302), while the second part of EQUATION (2) represents the cosine distance between adjusted $d_1$ and $d_2$, denoted as $d'_1$ and $d'_2$ respectively, in terms of token frequencies. Again, note that $d_1$ and $d_2$ are included in both D and $D^R$.

In particular embodiments, a document may be considered as a collection of unique tokens (e.g., words, numbers, or a combination thereof), which may be denoted as $d=\{t_1, t_2, \ldots t_l\}$, where $l \geq 1$ and each $t_i \in d$ denotes a particular token from the document, d. Each unique token, t, may appear in d one or more times. Let f represent the number of times (i.e., the frequency) a given token, t, appears in d. Particular embodiments may determine the actual frequency for each unique token of a document by counting the number of appearances of the token in the document. Then in terms of token frequency, the document, d, may be expressed as $d=\{f_1, f_2, \ldots f_l\}$, where $f_1$ is the frequency of the first token, $t_1$, in d, $f_2$ is the frequency of the first token, $t_2$, in d, and so on. For example, $d_1$ may be expressed in terms of token frequency as $d_1=\{f_1^1, f_2^1, \ldots f_{l^1}^1\}$, where $l^1 \geq 1$; and $d_2$ may be similarly expressed in terms of token frequency as $d_2=\{f_1^2, f_2^2, \ldots f_{l^2}^2\}$, where $l^2 \geq 1$. Of course, $d_1$ and $d_2$ may have different numbers of unique tokens (i.e., $l^1 \neq l^2$), and a token that appears in both $d_1$ and $d_2$ may have two different frequencies with respect to $d_1$ and $d_2$.

In particular embodiments, a search query may also be a collection of tokens. Particular embodiments may consider a document relevant to a specific search query if the document contains the search query (i.e., the search query also appears in the document one or more times). Given a document that contains a search query, for each unique token in the document, particular embodiments may determine a shortest distance, in terms of, for example, a number of tokens, any appearance of the token is from any appearance of the search query within the document. For example, suppose a search query, q, includes three tokens, $t_1$, $t_2$, and $t_3$, and appears in a document, d, once, at the location that begins with the tenth token and ends with the twelfth token in the document. Further suppose that another token, $t_4$, appears in the document three times, at the second token, the fifteenth token, and the thirty-fifth token. There are three distances from the three appearances of the token, $t_4$, to the single appearance of the search query, q, in d. Specifically, from the second token to the tenth token, the distance is eight tokens. From the fifteenth token to the twelfth token, the distance is three tokens. And from the thirty-fifth token to the twelfth token, the distance is thirteen tokens. Therefore, for $t_4$, the shortest distance between any appearance of $t_4$ and any appearance of q in d is three. Particular embodiments may similarly determine a shortest distance between any appearance of each unique token, t, in d and any appearance of q in d.

Given a document, d, that contains a search query, q, let $dis_{min}$ denote the shortest distance between any appearance of a token, t, and any appearance of the search query, q, in d. Recall that f represents the frequency of t in d (i.e., the number of times t appears in d). For each unique token in d, particular embodiments may adjust its frequency as:

$$f' = f \times \frac{1}{\sqrt{dis_{min}}}. \quad (3)$$

More specifically, for a token, $t_i$, that has a frequency, $f_i$, in d, its adjusted frequency may be computed as $$f_i' = f_i \times \frac{1}{\sqrt{dis_{min}^i}}.$$

Particular embodiments may adjust the frequency of each unique token in d using EQUATION (3).

In particular embodiments, with respect to the second part of EQUATION (2), $d'_1$ may be a set of adjusted frequencies of the unique tokens that appear in $d_1$ (e.g., as determined using EQUATION (3)), such that $d'_1=\{f_1'^1, f_2'^1, \ldots f_{l^1}'^1\}$. Similarly, $d'_2$ may be a set of adjusted frequencies of the unique tokens that appear in $d_2$ (e.g., again, as determined using EQUATION (3)), such that $d'_2=\{f_1'^2, f_2'^2, \ldots f_{l^2}'^2\}$.

In particular embodiments, α is the weight (e.g., a value between 0 and 1) assigned to the first part of EQUATION (2), which may be used the control the influence of the results of offline clustering on the similarity measure computed for $d_1$ and $d_2$ similarly to EQUATION (1). In particular embodiments, α may be determined based on experiments or empirical data or assigned a default value.

In particular embodiments, for each unique pair of documents from $D^R$, a similarity measure may be computed using either EQUATION (1) or EQUATION (2). Thereafter, particular embodiments may group the documents from $D^R$ (i.e., the search result identified for the search query in step 314) into specific clusters based on the similarity measures. The search result may then be presented to the user requesting the search in cluster format, where documents belonging to the same cluster are presented together, as illustrated in step 318 of FIG. 3.

In practice, the number of documents in D or the specific documents included in D may vary from time to time. For example, new documents may be added to D as they become available (e.g., new web pages or news articles are added to the network), or old documents may be removed from D when they are no longer available (e.g., old web pages or news articled are deleted from the network). If a new document becomes available and is added to D, particular embodiments may need to determine to which of the clusters resulted from performing clustering on D offline (e.g., as illustrated in step 302) the new document should be assigned. Instead of performing clustering on the entire set of documents each time a new document is added to D, particular embodiments may perform incremental clustering with respect to the new document only.

Suppose a new document is added to the set of documents, D, as illustrated in step 322 of FIG. 3. Previously, clustering has been performed on the documents from D offline using K clustering algorithms (e.g., as illustrated in step 302), which has resulted in K sets of clusters, $C^1, \ldots, C^K$. For each set of clusters (e.g., $C^k$), particular embodiments may determine to which specific cluster from the set (e.g., $C^k$) the new document belongs using the corresponding clustering algorithm (e.g., the $k^{th}$ clustering algorithm), as illustrated in step 324 of FIG. 3. In particular embodiments, for each existing cluster from each set of clusters, a distance (e.g., cosine distance) or similarity measure may be determined between the new document and the cluster. For example, each existing cluster may have a centroid document (e.g., one of the existing documents from the cluster that is determined to be representative of the characteristics of the cluster, or a separate document constructed based on the existing documents from the cluster that represents the characteristics of the cluster). A distance between the new document and the centroid document may be computed as the distance between the new document and the corresponding cluster. If the distance is below a predetermined threshold value, then particular embodiments may consider that the new document belongs to this particular cluster. Otherwise, particular embodiments may consider that the new document does not belong to the cluster. If there are multiple existing clusters from the same set of clusters that the distances between the clusters and the new document are below the threshold value, then particular embodiments may select the existing cluster that has the shortest distance with the new document as the cluster to which the new document belongs.

For each set of clusters (e.g., $C^k$) determined offline, if, based on the distances between the new document and the existing clusters from the set of clusters, it may be determined that the new document belongs to an existing cluster from the set (step 326, "YES"; e.g., the new document is related or similar to the documents that belong to one of the existing clusters from the set), then particular embodiments may assign the new document to that existing cluster from the set, as illustrated in step 328 of FIG. 3. On the other hand, if, using the corresponding clustering algorithm, it is determined that the new document does not belong to any existing cluster from the set (step 326, "NO"; e.g., the new document is not related or similar to any document that belongs any one of the existing clusters from the set), particular embodiments may create a new cluster, assign the new document to the new cluster, and add the new cluster to the set, as illustrated in step 330 of FIG. 3. In this case, the number of clusters in the set (e.g., $C^k$) is increased by one.

Figure 4:
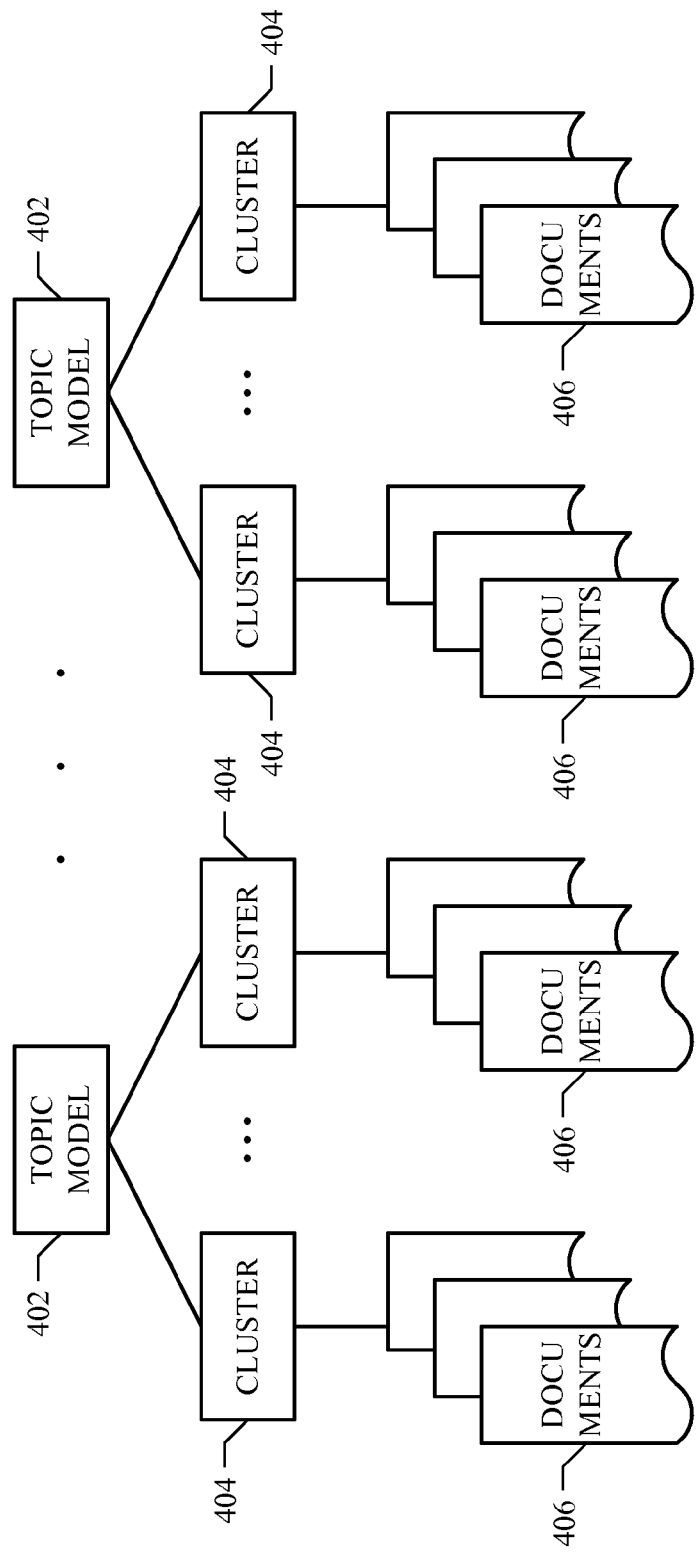
FIG. 4 illustrates an example hierarchy between topic models, clusters and documents.

Sometimes, several clustering algorithms may be used when performing clustering on the documents from D offline (e.g., as illustrated in step 302), and using each clustering algorithm may result in a large set of clusters. Thus, computing a distance between the new document and each and every existing cluster from each and every set of clusters may require a significant amount of time and computer resources. Alternatively, for each set of clusters resulted from the offline clustering (e.g., as illustrated in step 302), particular embodiments may constructed one or more topic models and assign each cluster from the set to one of the topic models using an appropriate modeling algorithm, such as, for example and without limitation, Linear Discriminant Analysis (LDA) or Latent Semantic Indexing (LSI). Thus, there may be a hierarchy between topic models, clusters and documents, an example of which is illustrated in FIG. 4. In particular embodiments, at the top level, there may one or more topic models 402. Each topic model 402 may contain one or more clusters 404. And each cluster 404 may contain one or more documents 406. In particular embodiments, each topic model 402 may be a set of tokens that are representative to that topic model (e.g., tokens that are likely to be associated or popular with that topic model). For example, a topic model "sports" may include tokens such as "basketball", "football", "baseball", "golf", and "tennis".

Thereafter, given a new document that is to be added to the set of documents, D, as illustrated in step 322 of FIG. 3, for each set of clusters (e.g., $C^k$) resulted from performing clustering on D offline (e.g., as illustrated in step 302 of FIG. 3), particular embodiments may first determine to which topic model the new document belongs. Then, particular embodiments may only need to determine to which cluster included in that topic model the new document belongs, using, for example, the method described in connection with steps 324, 326, 328, and 330 of FIG. 3. More specifically, particular may determine if the new document belongs to one of the existing clusters of the topic model. If so, the new document may be added to that existing cluster of the topic model. Otherwise, a new cluster may be created and added to the set of clusters. The new cluster may be assigned to the topic model, and the new document may be added to the new cluster. In this case, the number of clusters that need to be analyzed (e.g., computing the distances between the new document and the individual clusters) may decrease significantly since only the clusters of a specific topic model need to be analyzed, thus saving time and computer resources.

Figure 5:
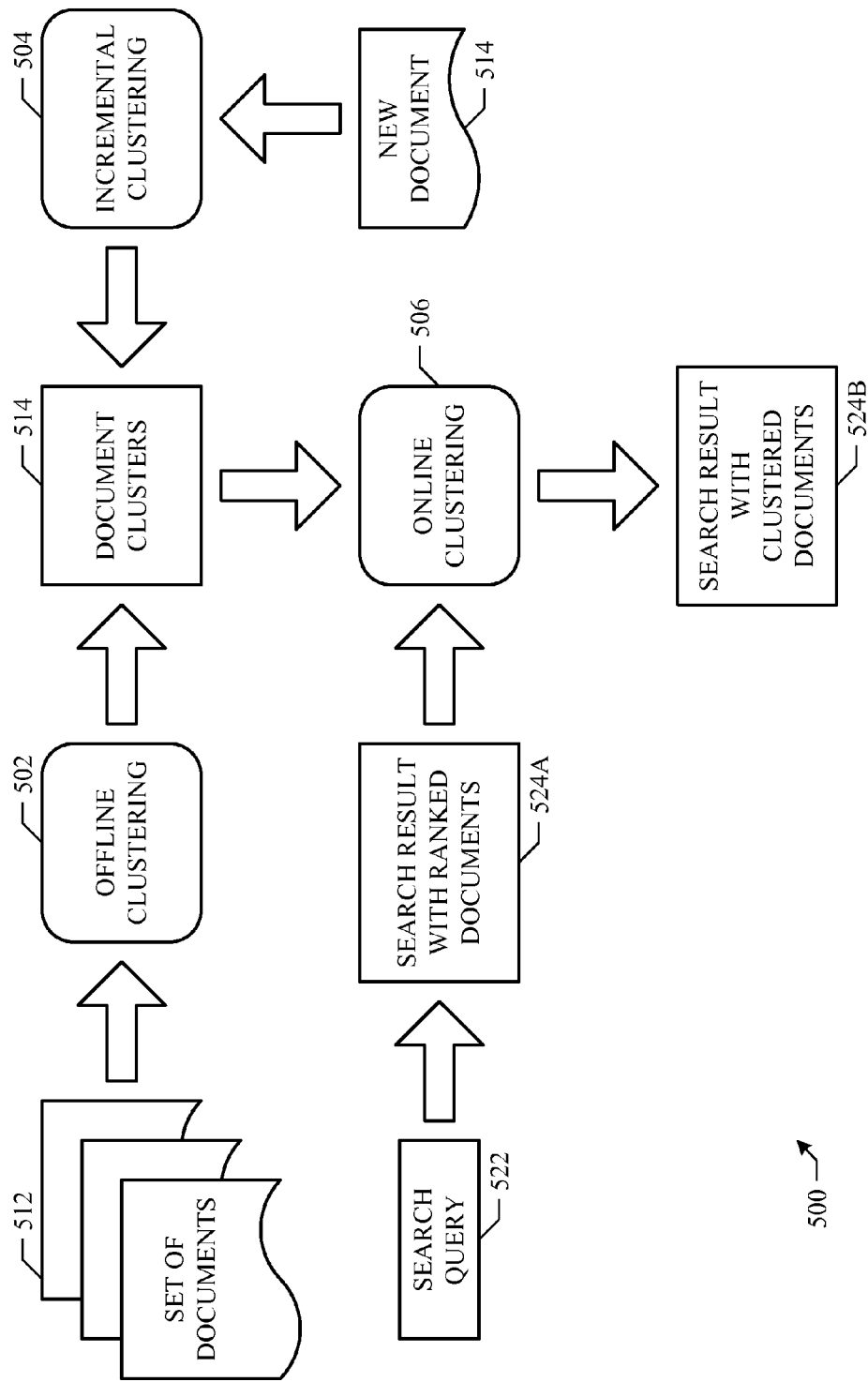
FIG. 5 illustrates an example system and process flow.

FIG. 5 illustrates an example system 500 and process flow that reflect the steps illustrated in FIG. 3. In particular embodiments, system 500 may include components 502, 504, 506, which may each be implemented as computer software, hardware or a combination thereof.

In particular embodiments, component 502 may take as input a set of documents 512, perform clustering on document set 512 offline using one or more clustering algorithms, and provide as output one or more corresponding sets of clusters 514 (e.g., as illustrated in step 302 of FIG. 3). In particular embodiments, with respect to each set of clusters, a document from document set 512 belongs to one of the clusters from the cluster set.

In particular embodiments, component 504 may take as input a new document 514 added to document set 512, and for each set of clusters resulted from performing clustering on document set 512 offline, determine to which cluster from the cluster set new document 514 belongs (e.g., performing incremental clustering for new document 514 as illustrated in steps 324, 326, 328, 330 of FIG. 3).

In particular embodiments, component 506 may take as input an un-clustered search result 524A identified in response to a search query 522, perform clustering on search result 524A online using cluster sets 514 and other appropriate information, and provide as output a clustered search result 524B (e.g., as illustrated in step 316 of FIG. 3).

Figure 6:
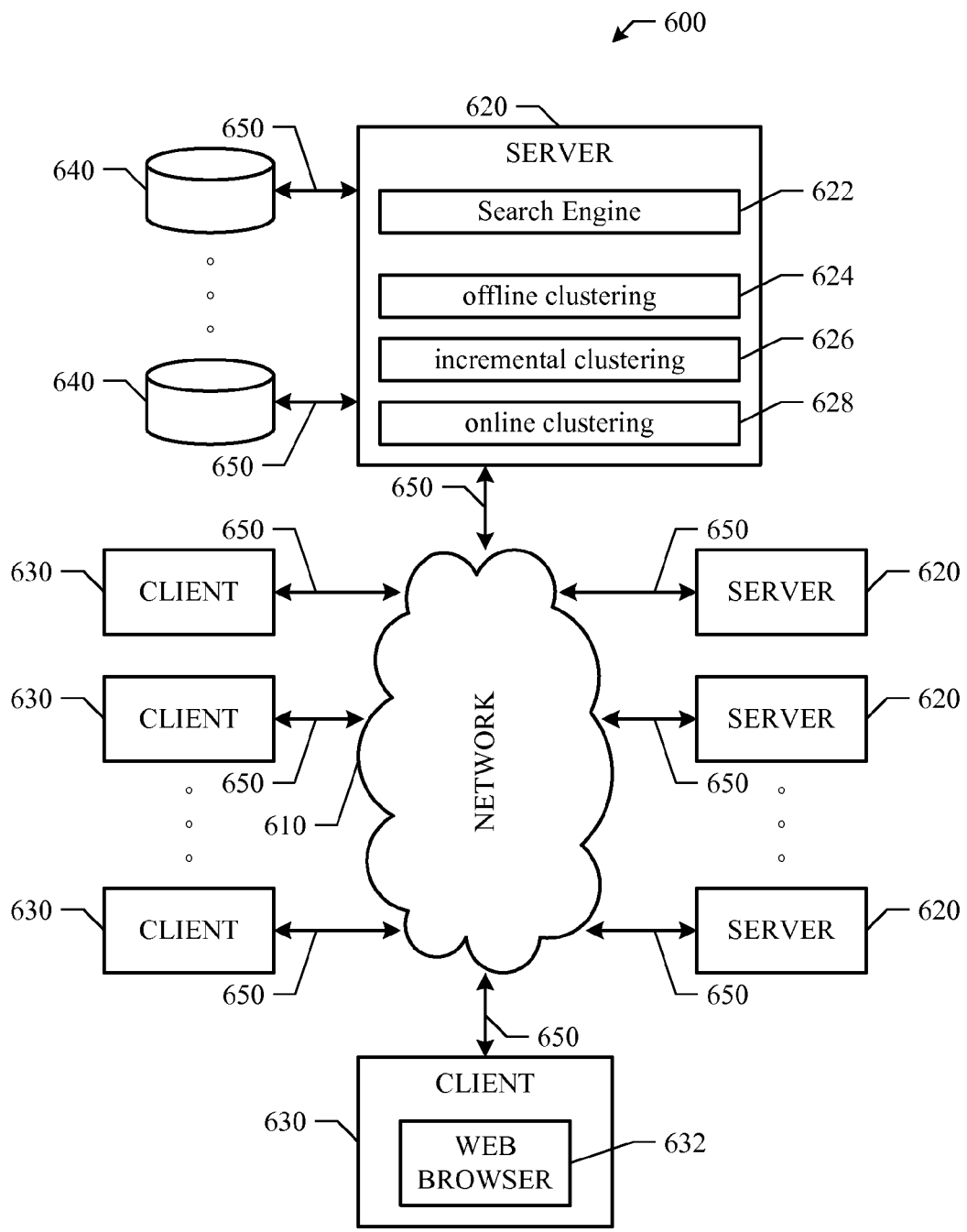
FIG. 6 illustrates an example network environment.

Particular embodiments may be implemented in a network environment. FIG. 6 illustrates an example network environment 600 suitable for providing software validation as a service. Network environment 600 includes a network 610 coupling one or more servers 620 and one or more clients 630 to each other. In particular embodiments, network 610 is an intranet, an extranet, a virtual private network (VPN), a local area network (LAN), a wireless LAN (WLAN), a wide area network (WAN), a metropolitan area network (MAN), a portion of the Internet, or another network 610 or a combination of two or more such networks 610. The present disclosure contemplates any suitable network 610.

One or more links 650 couple a server 620 or a client 630 to network 610. In particular embodiments, one or more links 650 each includes one or more wireline, wireless, or optical links 650. In particular embodiments, one or more links 650 each includes an intranet, an extranet, a VPN, a LAN, a WLAN, a WAN, a MAN, a portion of the Internet, or another link 650 or a combination of two or more such links 650. The present disclosure contemplates any suitable links 650 coupling servers 620 and clients 630 to network 610.

In particular embodiments, each server 620 may be a unitary server or may be a distributed server spanning multiple computers or multiple datacenters. Servers 620 may be of various types, such as, for example and without limitation, web server, news server, mail server, message server, advertising server, file server, application server, exchange server, database server, or proxy server. In particular embodiments, each server 620 may include hardware, software, or embedded logic components or a combination of two or more such components for carrying out the appropriate functionalities implemented or supported by server 620. For example, a web server is generally capable of hosting websites containing web pages or particular elements of web pages. More specifically, a web server may host HTML files or other file types, or may dynamically create or constitute files upon a request, and communicate them to clients 630 in response to HTTP or other requests from clients 630. A mail server is generally capable of providing electronic mail services to various clients 630. A database server is generally capable of providing an interface for managing data stored in one or more data stores.

In particular embodiments, a server 620 may include a search engine 622, an offline clustering component 624, an incremental clustering component 626, and an online clustering component 628. Search engine 622, offline clustering component 624, incremental clustering component 626, and online clustering component 628 may each be implemented as computer software, hardware, or a combination thereof and my perform some of the functionalities illustrated in FIG. 3. For example, search engine 622 may identify search results for search queries. Offline clustering component 624 may perform clustering on a corpus of document offline and determine to which clusters a new document may belong. Incremental clustering component 626 may perform incremental clustering on new documents added to the corpus of document. Online clustering component 628 may perform clustering on search results identified by search engine 622 online. Alternatively, in particular embodiments, online clustering component 628 may be a part of search engine 622.

In particular embodiments, one or more data storages 640 may be communicatively linked to one or more severs 620 via one or more links 650. In particular embodiments, data storages 640 may be used to store various types of information. In particular embodiments, the information stored in data storages 640 may be organized according to specific data structures. In particular embodiment, each data storage 640 may be a relational database. Particular embodiments may provide interfaces that enable servers 620 or clients 630 to manage, e.g., retrieve, modify, add, or delete, the information stored in data storage 640.

In particular embodiments, each client 630 may be an electronic device including hardware, software, or embedded logic components or a combination of two or more such components and capable of carrying out the appropriate functionalities implemented or supported by client 630. For example and without limitation, a client 630 may be a desktop computer system, a notebook computer system, a netbook computer system, a handheld electronic device, or a mobile telephone. The present disclosure contemplates any suitable clients 630. A client 630 may enable a network user at client 630 to access network 630. A client 630 may enable its user to communicate with other users at other clients 630.

A client 630 may have a web browser 632, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 630 may enter a Uniform Resource Locator (URL) or other address directing the web browser 632 to a server 620, and the web browser 632 may generate a Hyper Text Transfer Protocol (HTTP) request and communicate the HTTP request to server 620. Server 620 may accept the HTTP request and communicate to client 630 one or more Hyper Text Markup Language (HTML) files responsive to the HTTP request. Client 630 may render a web page based on the HTML files from server 620 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 7:
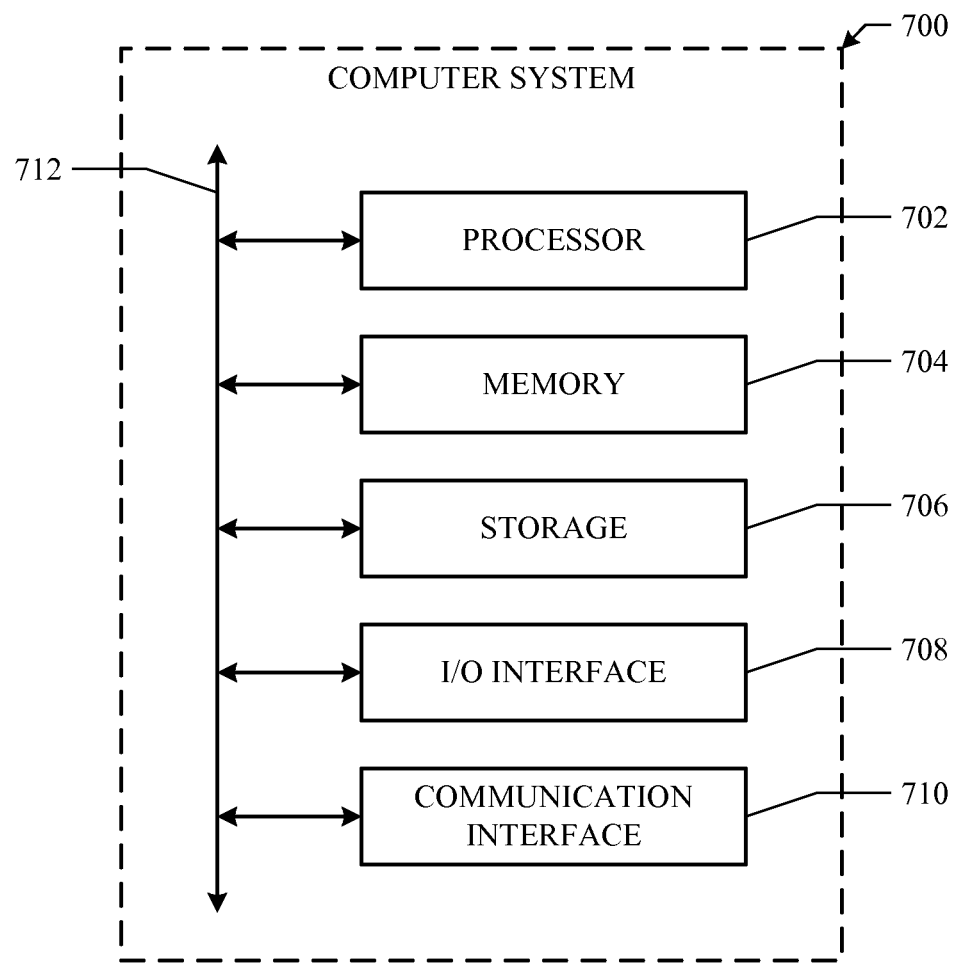
FIG. 7 illustrates an example computer system.

Particular embodiments may be implemented on one or more computer systems. FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 700 may include one or more computer systems 700; be unitary or distributed; span multiple locations; span multiple machines; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. The present disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. The present disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include an HDD, a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 702 (such as, for example, one or more internal registers or caches), one or more portions of memory 704, one or more portions of storage 706, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method, comprising:
   clustering a plurality of documents to obtain one or more first sets of clusters, wherein a first cluster of the one or more first sets of clusters comprises at least two first individual documents of the plurality of documents;
   accessing a search query after the clustering the plurality of documents;
   identifying a search result in response to the search query, wherein the search result comprises the at least two first individual documents of the plurality of documents; and
   clustering the search result to obtain a second set of clusters, wherein second individual documents of the search result belong to one second cluster of the second set of clusters, the clustering the search result comprising:
   for a unique pair of the second individual documents, computing a similarity measure for the second individual documents with respect to the search query based, at least in part, on the one or more first sets of clusters, wherein the similarity measure for the second individual documents is computed based, at least in part, on a weighted sum of a clustering similarity between the second individual documents with respect to the one or more first sets of clusters and a query-based similarity between the second individual documents with respect to the search query; and
   clustering the second individual documents based, at least in part, on the similarity measure;
   wherein the query-based similarity between the second individual documents is based, at least in part, on a fraction of a sum of:
   a textual match between the search query and the second individual documents to the textual match between the query, and
   the intersection of the documents; and
   wherein the clustering similarity between the second individual documents with respect to the one or more first sets of clusters is based, at least in part, on a weighted combination of agreements between the one or more first sets of clusters and the second individual documents.

2. The method recited in claim 1, wherein for the unique pair of result documents, the computing of the similarity measure for the unique pair of result documents as a weighted sum is further based, at least in part, on a cosine similarity between the two documents.

3. The method recited in claim 1, further comprising:
accessing a new document; and
determining whether the new document belongs to a cluster from the first set of clusters;
in response to determining that the new document belongs to the cluster from the first set of clusters, adding the new document to the cluster from first set of clusters; and
in response to determining that the new document does not belong to any cluster from the first set of clusters, creating a new cluster, adding the new document to the new cluster, and adding the new cluster to the first set of clusters.

4. The method recited in claim 1, further comprising grouping clusters from the first set of clusters into a plurality of topic models, wherein individual clusters from the first set of clusters belong to one of the topic models.

5. The method recited in claim 4, further comprising:
accessing a new document; and
determining one of the topic models corresponding to a first clustering associated with the new document;
determining whether the new document belongs to a cluster of the one of the topic models;
in response to determining that the new document belongs to the cluster of the one of the topic models, adding the new document to the cluster of the one of the topic models; and
in response to determining that the new document does not belong to any clusters of the one of the topic models, creating a new cluster, adding the new document to the new cluster, adding the new cluster to a first set of clusters, and assigning the new cluster to the one of the topic models.

6. The method recited in claim 1, further comprising presenting the second individual documents of the search result according to the second set of clusters.

7. A system, comprising:
a memory comprising instructions executable by one or more processors; and
one or more processors coupled to the memory, the one or more processors to execute the instructions to:
cluster a plurality of documents to obtain one or more first sets of clusters, wherein a first cluster of the one or more first sets of clusters is to comprise at least two first individual documents of the plurality of documents;
access a search query after the cluster of the plurality of documents;
identify a search result in response to the search query, the search result to comprise the at least two first individual documents of the plurality of documents;
cluster the search result to obtain a second set of clusters, second individual documents of the search result to belong to one second cluster of the second set of clusters, the cluster of the search result to comprise:
for a unique pair of the second individual documents a similarity measure for the result documents with respect to the search query to be computed to be based, at least in part, on the one or more first sets of clusters, wherein the similarity measure for the second individual documents is to be computed to be based, at least in part, on a weighted sum of a clustering similarity between the second individual documents with respect to the one or more first sets of clusters and a query-based similarity between the second individual documents with respect to the search query; and
the second individual documents to be clustered to be based, at least in part, on the similarity measure;
wherein the query-based similarity between the second individual documents is to be based, at least in part, on a fraction of a sum of:
a textual match between the search query and the second individual documents to the textual match between the query, and
the intersection of the documents; and
wherein the clustering similarity between the second individual documents with respect to the one or more first sets of clusters is to be based, at least in part, on a weighted combination of agreements between the one or more first sets of clusters and the second individual documents.

8. The system recited in claim 7, wherein for the unique pair of result documents, to compute the similarity measure as a weighted sum is to be further based, at least in part, on a cosine similarity between the two documents.

9. The system recited in claim 7, wherein the instructions are further executable by the one or more processors to:
access a new document; and
determine whether the new document is to belong to a cluster from the first set of clusters;
in response to a determination that the new document is to belong to the cluster from the first set of clusters, to add the new document to the one of the clusters from the first set of clusters; and
in response to a determination that the new document does not belong to any cluster from the first set of clusters, to create a new cluster, to add the new document to the new cluster, and to add the new cluster to the first set of clusters.

10. The system recited in claim 7, wherein the instructions are further executable by the one or more processors to group clusters from the first set of clusters into a plurality of topic models, individual clusters from the first set of clusters to belong to one of the topic models.

11. The system recited in claim 10, wherein the instructions are further executable by the one or more processors to:
access a new document; and
determine one of the topic models corresponding to a first clustering to be associated with the new document;
determine whether the new document is to belong to a cluster of the one of the topic models;
in response to a determination that the new document is to belong to the cluster of the one of the topic models, add the new document to the cluster of the one of the topic models; and
in response to a determination that the new document is to not belong to any of the clusters of the one of the topic models, to create a new cluster, to add the new document to the new cluster, to add the new cluster to the first set of clusters, and to assign the new cluster to the one of the topic models.

12. The system recited in claim 7, wherein the instructions are further executable by the one or more processors to present the second individual documents of the search result to be according to the second set of clusters.

13. One or more computer-readable tangible storage media comprising: instructions executable by one or more computer systems to:

cluster a plurality of documents to obtain one or more first sets of clusters, wherein a first cluster of the one or more first sets of clusters is to comprise at least two first individual documents of the plurality of documents;

access a search query after the cluster of the plurality of documents;

identify a search result in response to the search query, the search result to comprise the at least two first individual documents of the plurality of documents; and cluster the search result to obtain a second set of clusters, second individual result documents of the search result to belong to one second cluster of the second set of clusters, the cluster of the search result to comprise:

for a unique pair of the second individual documents, a similarity measure for the second individual documents with respect to the search query to be computed to be based, at least in part, on the one or more first sets of clusters, wherein the similarity measure for the second individual documents is to be computed to be based, at least in part, on a weighted sum of a clustering similarity between the second individual documents with respect to the one or more first sets of clusters and a query-based similarity between the second individual documents with respect to the search query; and the second individual documents to be clustered to be based, at least in part, on the similarity measure;

wherein the query-based similarity between the second individual documents is to be based, at least in part, on a fraction of a sum of:

a textual match between the search query and the second individual documents to the textual match between the query, and the intersection of the documents; and wherein the clustering similarity between the second individual documents with respect to the one or more first sets of clusters is to be based, at least in part, on a weighted combination of agreements between the one or more first sets of clusters and the second individual documents.

14. The media recited in claim 13, wherein for the unique pair of result documents, to compute the similarity measure as a weighted sum is to be further based, at least in part, on a cosine similarity between the two documents.

15. The media recited in claim 13, wherein the instructions are further executable by the one or more computer systems to:

access a new document; and determine whether the new document is to belong to a cluster from the first set of clusters;

in response to a determination that the new document is to belong to the cluster from the first set of clusters, add the new document to the cluster from the first set of clusters; and in response to a determination that the new document does not belong to any cluster from the first set of clusters, create a new cluster, add the new document to the new cluster, and add the new cluster to the first set of clusters.

16. The media recited in claim 13, wherein the instructions are further executable by the one or more computer systems to group clusters from the first set of clusters into a plurality of topic models, individual cluster from the first set of clusters to belong to one of the topic models.

17. The media recited in claim 16, wherein the instructions are further executable by the one or more computer systems to:

access a new document; and determine one of the topic models to correspond to a first clustering to be associated with the new document;

determine whether the new document is to belong to a cluster of the one of the topic models;

in response to a determination that the new document is to belong to the cluster of the one of the topic models, add the new document to the cluster of the one of the topic models; and in response to a determination that the new document is to not belong to any of the clusters of the one of the topic models, to create a new cluster, to add the new document to the new cluster, to add the new cluster to the first set of clusters, and to assign the new cluster to the one of the topic models.

18. The media recited in claim 13, wherein the instructions are further executable by the one or more computer systems to present the second individual documents of the search result to be according to the second set of clusters.

* * * * *